United States Patent [19]

Hoffman et al.

[11] Patent Number: 5,156,533
[45] Date of Patent: Oct. 20, 1992

[54] REPLACEABLE PLASTIC TROLLEY WHEEL AND METHOD

[76] Inventors: Frank F. Hoffman, 1145 N. River Rd., St. Clair, Mich. 48079; Arnold R. Hoffman, 274 Longford Dr., Rochester, Mich. 48063

[21] Appl. No.: 914,870

[22] Filed: Oct. 3, 1986

Related U.S. Application Data

[63] Continuation-in-part of Ser. No. 787,771, Oct. 15, 1985, abandoned.

[51] Int. Cl.⁵ .............................................. B61B 3/00
[52] U.S. Cl. ...................................... 105/148; 104/89
[58] Field of Search ................ 105/154, 148; 384/300, 384/296; 104/93, 94, 95, 89

[56] References Cited

U.S. PATENT DOCUMENTS

| | | | |
|---|---|---|---|
| 2,250,167 | 7/1941 | Niles et al. | 105/154 |
| 2,978,992 | 4/1961 | Wason | 105/154 |
| 4,178,856 | 12/1979 | Dunville | 105/154 X |
| 4,248,157 | 2/1981 | Evans | 104/95 X |
| 4,395,142 | 7/1983 | Lobeck | 384/300 X |
| 4,428,689 | 1/1984 | Choate | 384/296 |
| 4,463,683 | 8/1984 | Uttscheid | 104/94 X |
| 4,552,073 | 11/1985 | Smith | 105/154 |

*Primary Examiner*—Russell D. Stormer
*Attorney, Agent, or Firm*—Reising, Ethington, Barnard, Perry & Milton

[57] ABSTRACT

A trolley wheel assembly (10,100) includes a wheel member (18,118) and a support pin (12) defining an axis of rotation. A mounting sleeve 922,122) is fixedly secured about the support pin (12). Bearing sleeve halves (30,32,130,132) are disposed about the mounting sleeve (22,122) for allowing rotation of the wheel member (18,118) about the axis of rotation. Further, a method of replacing a worn trolley wheel includes the steps of removing the worn trolley wheel from the support pin (12), mounting a bearing sleeve 926,126) over a mounting sleeve (22,122) for allowing rotation of the wheel member 918,118) relative to the axis of rotation when the mounting sleeve (22) is mounted on the support pin (12), and mounting an unworn wheel member (18) about the bearing sleeve (26) for rotation relative thereto, and fixedly securing the mounting sleeve (22) about the support pin (12).

25 Claims, 5 Drawing Sheets

REPLACEABLE PLASTIC TROLLEY WHEEL AND METHOD

This application is a continuation-in-part of U.S. Ser. No. 06/787,771 filed Oct. 15, 1985 now abandoned.

TECHNICAL FIELD

The subject invention relates to wheel assemblies for overhead trolley conveyors wherein the wheel assembly is journaled upon a pair of opposed connected load-carrying upright brackets.

BACKGROUND ART

The present invention relates to a plastic trolley wheel assembly for use in overhead monorail conveyors. Presently, plastic trolly wheels are commonly used in conjunction with metal sleeves, creating a metal to plastic friction bearing. When the trolley wheels have become worn and need to be replaced, the hanger to which the trolley wheel assembly is mounted must also be replaced. For example, the U.S. Pat. No. 2,924,431 to Chadbourne, issued Feb. 9, 1960 discloses a pulley including an integral thermoplastic wheel rotatably mounted on a fixed thermoplastic bearing. The stationary thermoplastic bearing is, in turn, fixedly mounted upon a stainless steel yoke. The narrow end of the yoke is adapted to permit attachment of a hook or another securing device to the yoke.

The U.S. Pat. No. 4,433,627 to Forshee, issued Feb. 28, 1984, discloses a plastic conveyor trolley including a plurality of plastic roller bearings disposed in longitudinally extending arcuate recesses spaced radially apart on the permimeter of a fixed hub section. The plastic roller bearings rotate relative to the fixed hub section when engaged by the body of the plastic trolley wheels.

The U.S. Pat. No. 3,738,477 to Gename, issued Jun. 12, 1973, discloses a packing plant conveyor trolley including a plastic bearing used in conjunction with a trolley wheel. The plastic bearing is fixedly mounted on an axle which terminates at its other end in a hook. The trolley slideably rotates over the fixed plastic bearing.

The present invention incorporates a plastic friction bearing, along with a removably mounted plastic trolley wheel and thus reduces the overall costs and the number of parts to be replaced. Additionally, unlike the prior art constructions, the instant invention teaches a trolley wheel and friction bearing assembly which incorporates the ease of replaceability in an efficient manner.

STATEMENT OF THE INVENTION

A trolley wheel assembly includes a wheel member and a support means defining an axis of rotation for supporting the wheel thereon. A bearing means is disposed between the support means and the wheel member for allowing rotation of the wheel member about the axis of rotation. The bearing means comprises a bearing sleeve rotatably supporting the wheel member for rotation relative to the axis of rotation.

The instant invention further provides a method of replacing a worn trolley wheel including the steps of removing the worn trolley wheel from a support means of a trolley assembly, the support means defining an axis of rotation, mounting a bearing sleeve over the support means, and mounting an unworn wheel member about the bearing sleeve for rotation relative to the axis of rotation.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
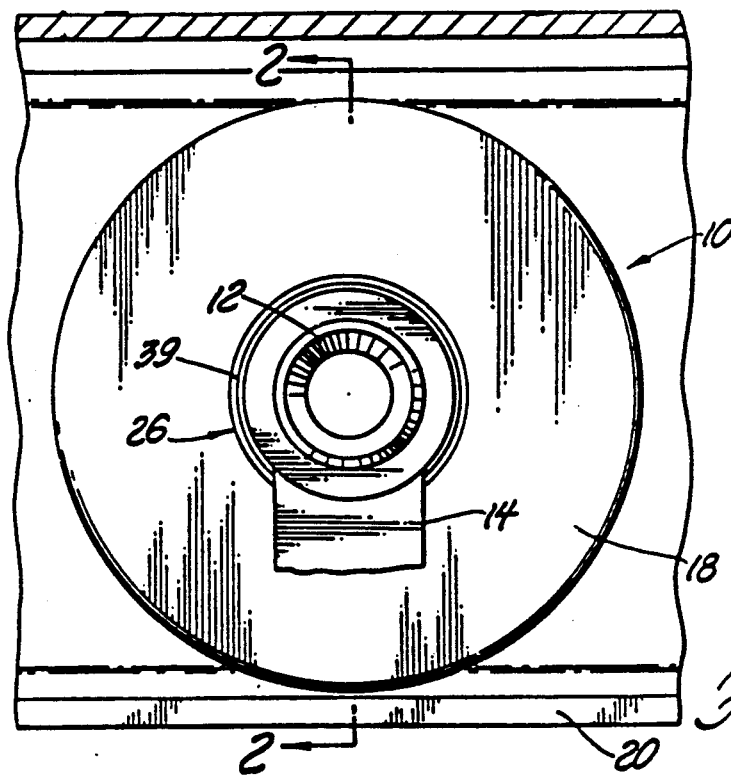
FIG. 1 is side view of the subject trolley wheel assembly mounted on a monorail.
Figure 2:
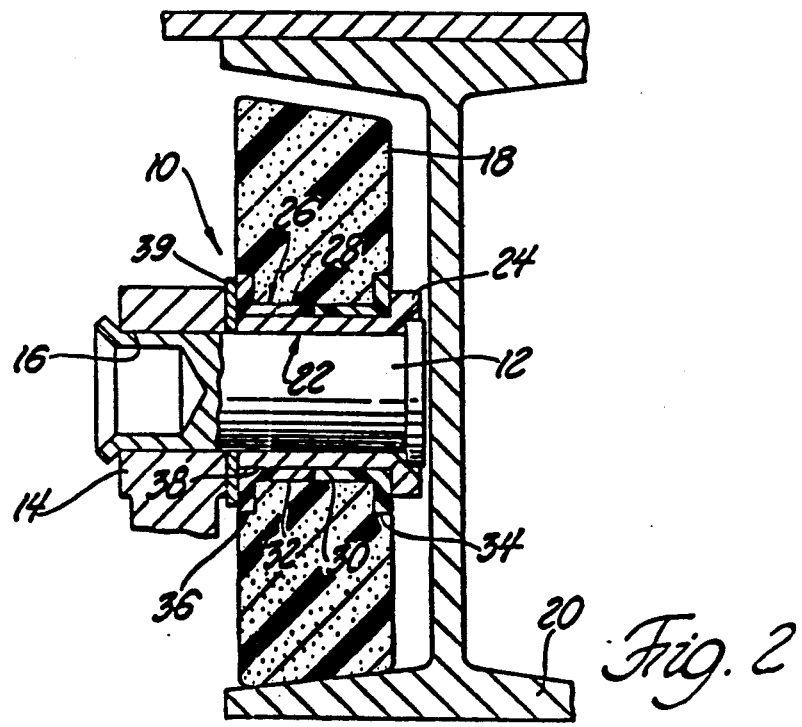
FIG. 2 is a cross-sectional view taken substantially along lines 2—2 of FIG. 1.
Figure 3:
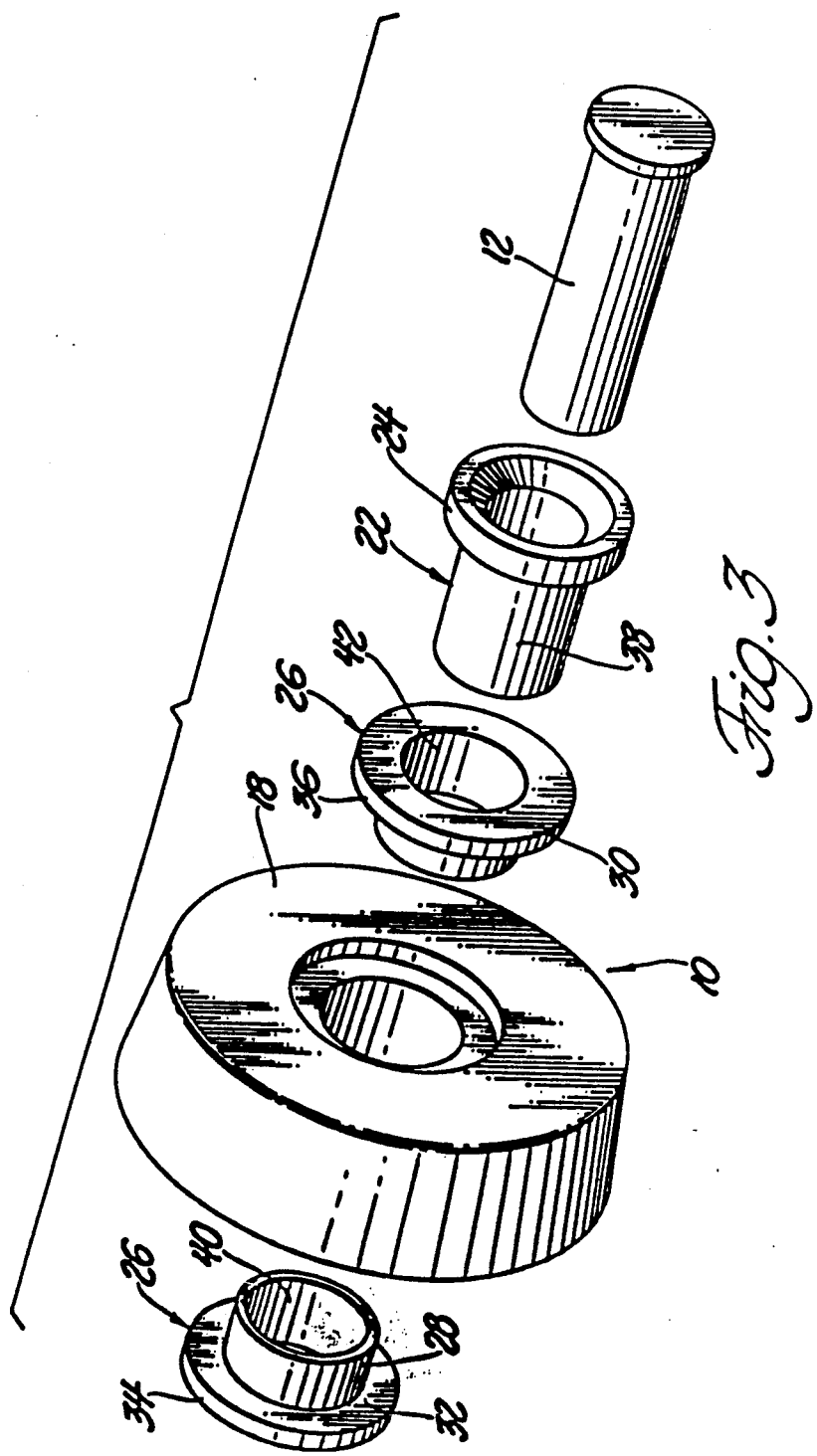
FIG. 3 is an exploded perspective view of the subject invention.

A trolley wheel assembly constructed in accordance with the instant invention is generally shown at 10 in FIGS. 1 through 3.

The assembly 10 includes a support pin 12. The support pin 12 may be an integral part of a hanger member 14 having an annular backing surface 50 or may be an independent pin extending through an opening 16 in the hanger member 14 as shown in FIG. 2. The support pin 12 provides wheel assembly support means defining an axis of rotation for supporting a trolley wheel member 18 thereon. The trolley wheel member 18 rides on a monorail 20 as shown in FIGS. 1 and 2.

A mounting sleeve 22 is fixedly secured about the support pin 12. The mounting sleeve 22 is a metallic member having a flange portion 24. The mounting sleeve 22 may be fixedly secured about the support pin 12 by swaging, a method commonly used in the art. Other means of fixedly securing the mounting sleeve 22 to the support pin 12 may be utilized as are common in the art.

The assembly 10 includes a bearing means, generally indicated at 26, disposed over the mounting sleeve 22. The bearing means 26 includes an outer wheel mounting surface 28. More specifically, the bearing means 26 comprises a bearing sleeve 26 mounted over the mounting sleeve 22. The bearing sleeve 26 includes stop means adjacent each end of the outer wheel mounting surface 28 for retaining the wheel member 18 therebetween. The bearing sleeve 26 comprises two sleeve halves 30 and 32. Each of the sleeve halves 30, 32 includes a tubular portion and one of the stop means. The stop means includes a flange 34, 36 extending radially outwardly from each of the sleeve halves 30, 32 respectively. The sleeve halves 30,32 are mounted on the mounting sleeve 22 with the tubular portions in end-to-end engagement defining the wheel mounting surface 28 between the flanges 34,36 as best shown in FIG. 2. In other words, the wheel member 18 is fit between the flanges 34 and 36 of the sleeve halves 30,32 in sliding engagement with the wheel mounting surface 28 and flanges 34,36. A retaining means 39 comprising a washer 39 which may be made of plastic is sandwiched between the wheel member 18 and the annular backing surface 50 of the hanger member 14.

The assembly 10 includes securing means for securing the bearing sleeve halves 30,32 to the mounting sleeve 22 in a fixed relationship at least relative to the axis of rotation defined by the mounting pin 12. The mounting sleeve 22 has an outer surface 38 and the bearing sleeve halves 30,32 include a friction fit inner surface 40,42 which are in frictional engagement with the outer surface 38 of the mounting sleeve 22. In other words, the bearing sleeve halves 30,32 are forcefit over the mounting sleeve 22. Alternatively, the bearing sleeve halves 30,32 may include ribbed inner surfaces for engaging a ribbed outer surface of the mounting sleeve 22. In this manner, the ribs will prevent rotation of the bearing sleeve halves 30,32 relative to the axis of rotation while allowing movement of the sleeves longitudinally therealong to allow for replacement thereof. Once assembled, the wheel member 18 rotates slideably over the outer diameter of the bearing sleeve halves 30,32 which are fixed relative to the other components of the assembly 10. The wheel member 18 is the only component of the assembly 10 that rotates. All other parts are fixed relative to each other. Once the wheel member 18 or bearing sleeve halves 30,32 have reached the end of their useful lives, either or both of them may be replaced. Additionally, the instant invention may be used for replacement of an already existing worn wheel member.

Preferably, the bearing sleeves halves 30,32 are made from a self-lubricating plastic. The wheel member 18 may also be made from a metal reinforced plastic. This combination provides a plastic-to-plastic contact at the only points of friction engagement between moving members of the assembly 10.

The bearing sleeves 30,32 and the wheel member 18 may be made from plastics having different hardnesses or durometers. Preferably, the replaceable wheel member 18 is made from the relatively softer plastic.

The instant invention further provides a method of replacing worn trolley wheels. The worn trolley wheel is removed from the support pin 12 of the trolley assembly 10, the support pin 12 defining the axis of rotation for the wheel mounted thereon. A bearing sleeve 26 is fixedly secured over the mounting sleeve 22 to fix the bearing sleeve 26 to the mounting sleeve 22 relative to the axis of rotation when the mounting sleeve 22 is mounted upon the support pin 12. An unworn or new wheel member 18 is mounted about the bearing sleeve 26 for rotation relative thereto. Finally, the mounting sleeve 22 is fixedly secured to the support pin 12.

More specifically, the wheel member 18 is mounted upon the bearing sleeve 26 by the steps of mounting a first bearing sleeve half 30 on the mounting sleeve 22 and sliding the wheel member 18 over the bearing sleeve half 30 to abut against the flange 34 extending radially outwardly from the bearing sleeve half 30. A second bearing sleeve half 32 is mounted on the mounting sleeve 22 to abut a second flange 36 extending radially outwardly from the second bearing sleeve half 32 against the other side of the wheel member 18. In this manner, the wheel member 18 is mounted between the flanges 34,36 on the wheel mounting surface 28 defined by the tubular portion of the bearing halves 30,32. The step of fixedly securing the bearing sleeve 26 to the mounting sleeve 22 may include the step of force-fitting the bearing sleeve 26 over the mounting sleeve 22. The step of fixedly securing the mounting sleeve 22 about the support pin 12 may be further defined by swaging the mounting sleeve 22 to the support pin 12. Thus, the instant invention provides a replacement trolley wheel assembly and a simple and efficient method of replacing a worn trolley wheel.

Figure 4:
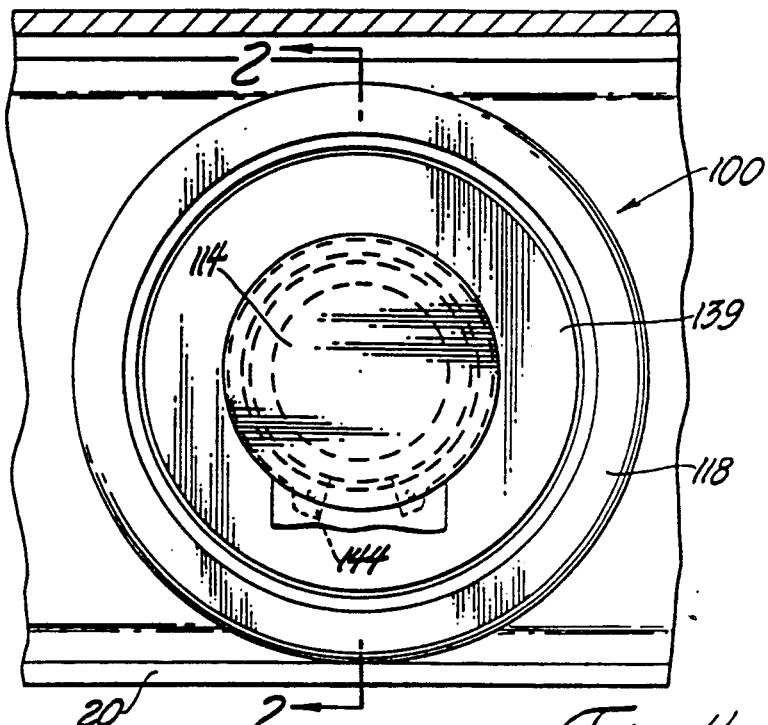
FIG. 4 is a side view of a first alternate embodiment mounted on a monorail.
Figure 5:
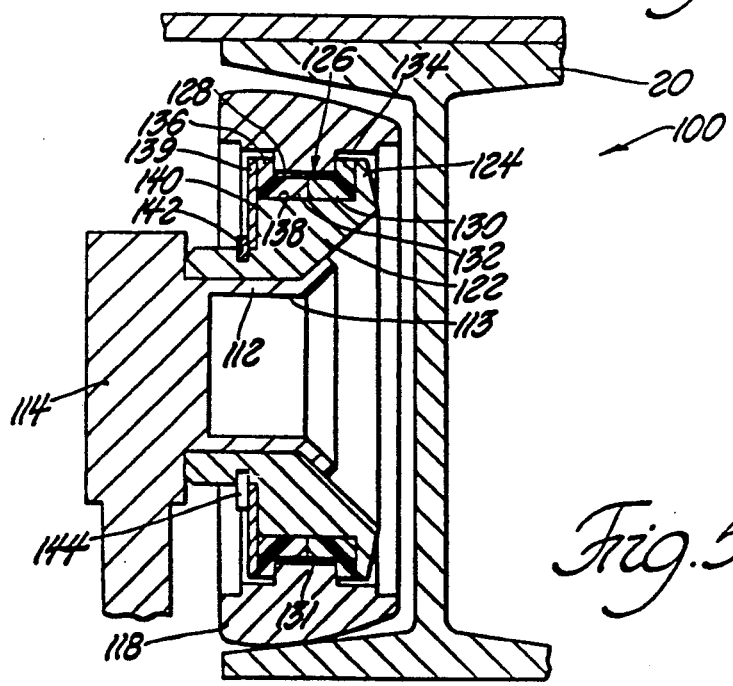
FIG. 5 is a cross-sectional view of the first alternate embodiment taken substantially along lines 5—5 of FIG. 4.
Figure 6:
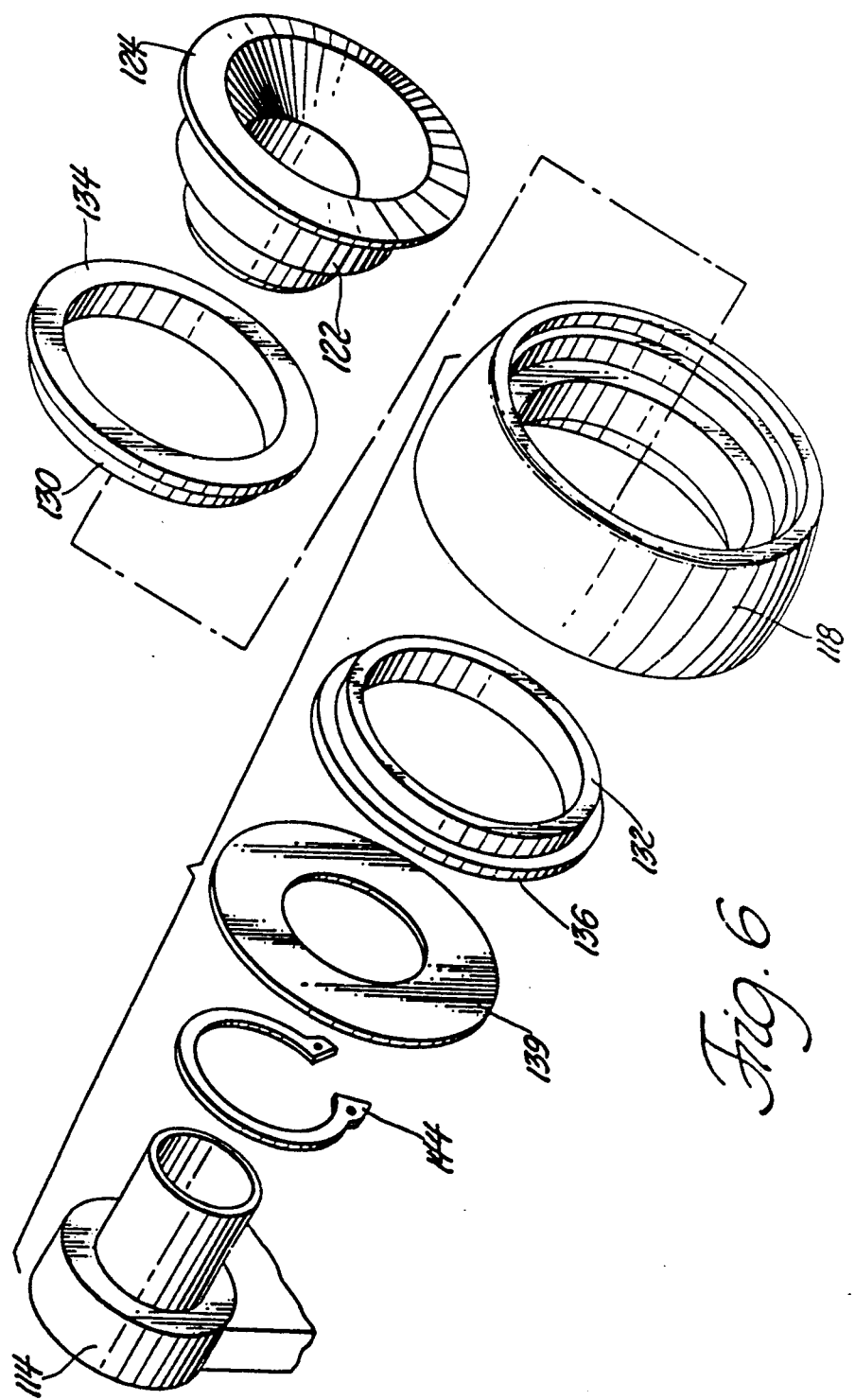
FIG. 6 is an exploded perspective view of the first alternate embodiment.

A first alternate embodiment of the trolley wheel assembly is generally shown at 100 in FIGS. 4 and 5. The assembly 100 includes a wheel member 118 and a support means 112 defining an axis of rotation for supporting the wheel member 118 thereon. The support means may include either a trolley mounting or support pin, or an annular cup member 112 having a cavity portion 113. In other words, a support pin or annular cup member 112 may be used as the support means 112. A hanger member 114 is mounted on the cup member 112 and adapted for attachement to a conveyor chain. The cup member 112 and hanger member 114 may be a one-piece integral member or may be an independent member. The cup member 112 provides wheel assembly support means defining an axis of rotation for supporting the trolley wheel 118 thereon. The trolley wheel 118 is metal or made from a metallic member. The trolley wheel 118 rides on a monorail 20, as shown in FIGS. 4 and 5.

A mounting sleeve 122 is fixedly secured about the cup member 112. The mounting sleeve 122 may be fixedly secured about the cup member 112 by swaging, a method commonly used in the art. In other words, the open end of the cup member 112 is expanded onto the mounting sleeve 122. The mounting sleeve 122 is a metallic member which is tubular having a flange portion 124 extending radially outwardly from one end of the mounting sleeve 122. The mounting sleeve 122 includes an annular outer surface 138 defined between the flange 124 and an annular shoulder 140 at the other end of the mounting sleeve 122.

The assembly 100 includes bearing means, generally indicated at 126, disposed over the mounting sleeve 122. The bearing means 126 is disposed between the support means 112 and the wheel member 118 for allowing rotation of the wheel member 118 about the axis of rotation. The bearing means 126 includes an annular outer wheel mounting surface 128. The mounting surface 128 has a polished surface or finish.

The bearing means 126 further includes a bearing sleeve 126 mounted over the mounting sleeve 122 and rotatably supporting the wheel member 118 for rotation relative to the axis of rotation. The bearing sleeve 126 is made from plastic. The bearing sleeve 126 may rotate about the axis of rotation due to the polished surface 138 of the mounting sleeve 1229 The bearing sleeve 126 includes stop means adjacent each end of the outer wheel mounting surface 128 for retaining the wheel member 118 therebetween. The bearing sleeve 126 comprises two sleeve halves 130 and 132. Each of the sleeve halves 130,132 includes a tubular portion and one of the stop means. The stop means includes a flange 134,136 extending radially outwardly from each of the sleeve halves 130,132 respectively. The sleeve halves 130,132 are mounted on the mounting sleeve 122 with the tubular portions in end-to-end engagement defining the wheel mounting surface 128 between the flanges 134,136 as best shown in FIG. 5. In other words, the wheel member 118 is fit between the flanges 134 and 136 of the sleeve halves 130,132.

At ambient temperatures, the outer wheel mounting surface 128 of the bearing sleeve 126 has a diameter less than the inner diameter 129 of the wheel member 118.

This results in a space 131 therebetween. In other words, there is a loose tolerance fit between the inner diameter 129 of the wheel member 118 and the diameter of the outer wheel mounting surface 128 of the bearing sleeve 126, resulting in a space 131 therebetween. This allows wheel member 118 mounted on the wheel mounting surface 128 of the bearing sleeve 126 to rotate relative to the bearing sleeve 126 and about the axis of rotation. Said another way, the wheel member 118 may either rotate simultaneously with the bearing sleeve 126 about the axis of rotation or the wheel member 118 may rotate about the bearing means 126 while the bearing means 126 may not rotate about the axis of rotation. In other words, the wheel member 118 and bearing means 126 may rotate independently of one another about the axis of rotation.

The bearing sleeve 126 is made of plastic. When the assembly 10 is exposed to heat such as in a paint oven, i.e. approximately 450° (degrees) F., the bearing sleeve 126 expands radially outwardly to engage or pick-up the inner diameter 129 of the wheel member 118. This results in an interference fit between the bearing sleeve 126 and wheel member 118 so that the bearing sleeve 126 and wheel member 118 rotate together as one unit about the axis of rotation. In other works, there is no relative rotation between the bearing sleeve 126 while wheel member 118 and the bearing sleeve 126 allows rotation about the axis of rotation.

The retaining means 139 includes a washer 139 disposed about the support means 112 adjacent to the wheel member 118 at one end of the bearing sleeve 126. The washer 139 is made from a self-lubricating plastic. The washer 139 acts as a safety seal and prevents contamination. The washer 139 allows the wheel member 118 and bearing sleeve 126 to rotate against the washer 139 with minimal friction.

The retaining means 139 further includes an annular groove 142 in the mounting sleeve 122 at the end opposite the flange 124 and adjacent the location of the washer 139. A retainer 144 such as a "snap-ring" is disposed in the groove 142 to prevent axial movement of the washer 139 along the axis of rotation. In other words, the retainer 144 sandwiches the washer 139 between one end of the bearing sleave 126 and the retainer 144.

The instant invention further provides a method of replacing worn trolley wheels. The worn trolley wheel 118 is removed from the support means 112 of the trolley assembly 100, the support means 112 defining the axis of rotation for the wheel mounted thereon. A bearing sleeve 126 is mounted over the mounting sleeve 122 for allowing rotation of the wheel member 118 about the axis of rotation. An unworn or new wheel member 118 is mounted about the bearing sleeve 126 for rotation relative thereto. The mounting sleeve 122 is fixedly secured to the support means 112.

More specifically, the wheel member 118 is mounted upon the bearing sleeve 126 by the steps of mounting a first bearing sleeve half 130 on the mounting sleeve 122 and sliding the wheel member 118 over the bearing sleeve half 130 to abut against the flange 134 extending radially outwardly from the bearing sleeve half 130. A second bearing sleeve half 132 is mounted on the mounting sleeve 122 to abut a second flange 136 extending radially outwardly from the second bearing sleeve half 132 against the other side of the wheel member 118. In this manner, the wheel member 118 is mounted between the flanges 134,136 on the wheel mounting surface 128 defined by the tubular portion of the bearing halves 130,132. The step of fixedly securing the mounting sleeve 122 about the support means 112 may be further defined by swaging the mounting sleeve 122 to the support means 112. Thus, the instant invention provides a replacement trolley wheel assembly and a simple and efficient method of replacing a worn trolley wheel.

Figure 7:
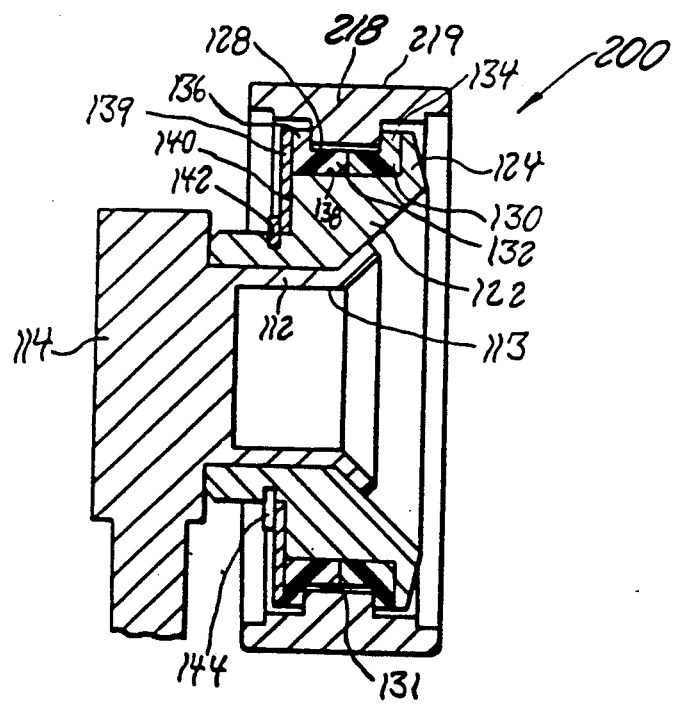
FIG. 7 is a cross-sectional view of a second alternate embodiment.

A second alternate embodiment of the trolley wheel assembly is generally shown at 200 in FIG. 7. The assembly 200 is similar to the assembly 100 except for the wheel member. The assembly 200 includes a wheel member 218 which has a flat or planar outer surface or diameter 219. The assembly 200 is referred to as a "side guide roller" which rotates perpendicularly between a pair of monorails 20. The assembly 200 operates similar to the assembly 100.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A trolley wheel assembly (10,100,200) comprising; a wheel member (18, 118,218), a support means (12,112) defining an axis of rotation for supporting said wheel member (18,118,218) thereon, a bearing means (26,126) disposed between said support means (12,112) and said wheel member (18,118,218) for allowing rotation of said wheel member (18,118,218) about said axis of rotation, said bearing means (26,126) comprising a bearing sleeve (26,126) rotatably supporting said wheel member (18,118,218) for rotation relative to said axis of rotation, said bearing sleeve (126) including an outer wheel mounting surface (128) having a diameter less than the inner diameter (129) of said wheel member (118,218) and resulting in a space (131) therebetween, for relative rotation between said wheel member (118,218) and said bearing sleeve (126), said bearing sleeve (126) expanding upon heating to engage said wheel member (118,218) to allow said wheel member (118,218) to rotate about said axis of rotation.

2. An assembly as set forth in claim 1 wherein said bearing sleeve (26,126) is made from plastic.

3. An assembly as set forth in claim 1 further characterized by said bearing sleeve (26,126) including a stop means at each end for retaining said wheel member (18,118,218) therebetween.

4. An assembly as set forth in claim 3 wherein said bearing sleeve (26,126) comprises two sleeve haves (30,32,130,132), each of said sleeve halves (30,32,130,132) including a tubular portion and one of said stop means.

5. An assembly as set forth in claim 4 wherein said stop means comprises a flange (34,36,134,136) extending radially outwardly from one end of said sleeve halves (30,32,130,132).

6. An assembly as set forth in claims 1 or 3 wherein said bearing sleeve (26,126) comprises two sleeve halves (30,32,130,132), each of said sleeve halves (30,32,130,132) including a tubular portion and a flange (34,36,134,136) extending radially outwardly from one end.

7. An assembly as set forth in claim 1 including a mounting sleeve (22,122) fixedly secured about said support means (12,112), said bearing sleeve (26,126) being disposed about said mounting sleeve (22,122).

8. An assembly as set forth in claim 7 including retaining means to prevent axial movement of said bearing sleeve (26,126) along said axis of rotation.

9. An assembly as set forth in claim 8 wherein said bearing sleeve (26,126) is made of plastic.

10. An assembly as set forth in claim 9 wherein said bearing sleeve (26,126) comprises two sleeves halves (30,32,130,132), each of said sleeve halves (30,32,130,132) including a tubular portion and a flange (34,36,134,136) extending radially outwardly from one end.

11. An assembly as set forth in claim 10 wherein said retaining means includes a flange (24,124) extending radially outwardly from one end of said mounting sleeve (22,122) adjacent one end of said bearing sleeve (26,126) and a washer (39,139) adjacent the other end of said bearing sleeve (26,126).

12. An assembly as set forth in claim 11 wherein said support means (12,112) includes a trolley mounting pin (12,112).

13. An assembly as set forth in claim 12 wherein said mounting sleeve (22,122) is swaged to said mounting pin (12,112).

14. An assembly as set forth in claim 13 wherein bearing sleeve (26, 126) and said wheel member (18, 118) are made from plastic and have different hardness.

15. An assembly as set forth in claim 14 including a hanger member (14,114) mounted on said mounting pin (12,112) and adapted for attachment to a conveyor chain.

16. An assembly as set forth in claim 15 wherein said retaining means further includes an annular groove (142) in said mounting sleeve (122) adjacent said washer (139) and a retainer (144) disposed in said groove (142) to prevent axial movement of said washer (139) along said axis of rotation.

17. An assembly as set forth in claim 16 wherein said washer (139) is made of plastic.

18. An assembly as set forth in claim 17 wherein said wheel member (118,218) is made from metal.

19. An assembly as set forth in claim 18 wherein said support means (112) includes a cup member (112) having a cavity portion (113).

20. An assembly as set forth in claim 19 wherein the open end of said cup member (112) is swaged to said mounting sleeve (122).

21. An assembly as set forth in claim 20 including a hanger member (14,114) mounted to said cup member (112) and adapted for attachment to a conveyor chain.

22. An assembly as set forth in claim 21 wherein said cup member (112) and said hanger member (114) are a one-piece integral member.

23. An assembly as set forth in claim 22 wherein said wheel member (218) has a planar outer surface (218).

24. A trolley wheel assembly (10,100,200) comprising; a wheel member (18,118,218), a support means (12,112) defining an axis of rotation for supporting said wheel member (18,118,218) thereon, a mounting sleeve (22,122) fixedly secured about said support means (12,112), a bearing sleeve (26,126), disposed about said mounting sleeve between said mounting sleeve (22,122) and said wheel member (18,118,218), said bearing sleeve (26,126) including a tubular portion (130,132) and at least one flange (134,136) extending radially outward from said tubular portion (130,132) of said bearing sleeve (26,126), said mounting sleeve (22,122) including a tubular portion (138) and a locking flange (124) extending radially outward from said tubular portion (138) of said mounting sleeve (22,122), said radially extending locking flange (124) being in abutting engagement with said at least one flange (134,136) on at least one end of said bearing sleeve (26,126), a retaining ring (139) disposed adjacent said wheel member (18,118,218) and said tubular portion (130,132) of said bearing sleeve (26,126) and said tubular portion (138) of said mounting sleeve (22,122) and opposite said at least one flange (134,136) of said bearing sleeve (26,126) and said locking flange (124) of said mounting sleeve (22,122), said wheel member (118,218) including a stepped inner bore for presenting an inner diameter (129) and a pair of shoulders disposed on either side of said inner diameter (129), said at least one flange (134,136) of said bearing sleeve (26,126) being disposed in abutting engagement with one of said pair of shoulders and said retaining ring (139) being disposed in abutting engagement with the other of said at least one flange (134,136), said assembly characterized by said bearing sleeve (126) including an outer wheel mounting surface (128) having a diameter less than the inner diameter (129) of said wheel member (118,218) and resulting in a space (131) therebetween, for relative rotation between said wheel member (118,218) and said bearing sleeve (126), said bearing sleeve (126) expanding upon heating to engage said wheel member (118,218) to allow said wheel member (118,218) to rotate about said axis of rotation.

25. An assembly as set forth in claim 24 further characterized by said mounting sleeve (22,122) being made of metal, said bearing sleeve (26,126) being made of plastic, said wheel member (118,218) being made of metal and said retaining ring (139) being made of plastic.

* * * * *